(12) United States Patent
Chavez

(10) Patent No.: US 12,473,182 B2
(45) Date of Patent: Nov. 18, 2025

(54) REARWARD MAST FORKLIFT CHASSIS

(71) Applicant: Robert M. Chavez, Odessa, TX (US)

(72) Inventor: Robert M. Chavez, Odessa, TX (US)

(*) Notice: Subject to any disclaimer, the term of this patent is extended or adjusted under 35 U.S.C. 154(b) by 0 days.

(21) Appl. No.: 19/012,071

(22) Filed: Jan. 7, 2025

(65) Prior Publication Data
US 2025/0223145 A1    Jul. 10, 2025

Related U.S. Application Data

(60) Provisional application No. 63/689,081, filed on Aug. 30, 2024, provisional application No. 63/618,766, filed on Jan. 8, 2024.

(51) Int. Cl.
*B66F 9/08*  (2006.01)
*B66F 9/075* (2006.01)
(Continued)

(52) U.S. Cl.
CPC ............ *B66F 9/08* (2013.01); *B66F 9/07554* (2013.01); *B66F 9/07559* (2013.01);
(Continued)

(58) Field of Classification Search
CPC .......... B66F 9/08; B66F 9/07559; B66F 9/16; B66F 17/003
See application file for complete search history.

(56) References Cited

U.S. PATENT DOCUMENTS 3,907,141 A * 9/1975 Ahrendt .................... B66F 9/06
                                                       296/190.04
4,520,903 A    6/1985 Arnold et al.
(Continued)

FOREIGN PATENT DOCUMENTS

| CA | 3146824 A1 * | 8/2022 | ............. B60Q 1/525 |
|----|--------------|--------|--------------------------|
| CN | 114477027 A * | 5/2022 | |

(Continued)

OTHER PUBLICATIONS

Forklift Trucks: Types, Uses and Safety Measures, Editorial by Industrial Quick Search, 26 pages.
(Continued)

*Primary Examiner* — Diem M Tran
(74) *Attorney, Agent, or Firm* — Thompson Patent Law Offices PC

(57) ABSTRACT

Apparatus and associated methods relate to a rearward mast forklift chassis. In an illustrative example, the rearward mast forklift chassis may include a fixed mast extending along a longitudinal axis positioned behind an axle of the front wheels of a forklift. The rearward mast forklift chassis may include a forklift device extending over the axle of the front wheels coupled to the fixed mast. The rearward mast forklift chassis may include an operator region located behind the fixed mast. The rearward mast forklift chassis may include a forklift device including a forklift positioned in front of the axle of the front wheels pivotally coupled to a tilt swivel and coupled to a tilt cylinder configured such cylinder may extend and/or retract to adjust an angle of the forklift. Various embodiments may advantageously improve efficiency, load stability, weight distribution, and safety.

18 Claims, 6 Drawing Sheets

(51) Int. Cl.
*B66F 9/16* (2006.01)
*B66F 17/00* (2006.01)

(52) U.S. Cl.
CPC .............. *B66F 9/0759* (2013.01); *B66F 9/16* (2013.01); *B66F 17/003* (2013.01)

(56) References Cited

U.S. PATENT DOCUMENTS

| | | |
|---|---|---|
| 5,190,435 A | 3/1993 | Epstein |
| 5,328,321 A | 7/1994 | Moffett et al. |
| 5,709,523 A | 1/1998 | Ware |
| 6,398,480 B1 | 6/2002 | Baginski et al. |
| 7,913,792 B2 | 3/2011 | Bruno |
| 11,591,198 B2 | 2/2023 | Dieringer et al. |
| 11,926,514 B1 | 3/2024 | O'Keeffe et al. |
| 2003/0007856 A1 | 1/2003 | Warner et al. |
| 2003/0168286 A1 | 9/2003 | Brown |
| 2003/0170108 A1 | 9/2003 | Hummer |
| 2007/0239312 A1* | 10/2007 | Andersen ................ B66F 9/065 700/213 |

FOREIGN PATENT DOCUMENTS

| | | | |
|---|---|---|---|
| CN | 117284975 A | * 12/2023 | |
| DE | 19535990 A1 | 4/1997 | |
| DE | 10004622 A1 | 5/2001 | |
| DE | 102014224520 A1 | 6/2016 | |
| EP | 1481942 A2 | * 12/2004 | .......... B66F 9/07563 |
| JP | H08259195 A | 10/1996 | |
| JP | H1036095 A | 2/1998 | |
| JP | 3012852 B2 | 2/2000 | |
| JP | 2002193596 A | 7/2002 | |
| JP | 2010030771 A | 2/2010 | |
| JP | 2010189174 A | 9/2010 | |
| KR | 102166631 B1 | * 10/2020 | |
| WO | WO-9916698 A1 | * 4/1999 | ................ B66F 9/22 |

OTHER PUBLICATIONS

IP Rally, Search Case Export dated Nov. 13, 2024, 21 pages.
Rough Terrain Stacker RT-S-62-AF, 5 pages.
The Engineering Choice: 15 Types of Forklifts: The Complete list, by Shivansh Sabhadiya, 13 pages.
Vestil powered drive rough terrain, 3000 lb, 5 pages.

* cited by examiner

REARWARD MAST FORKLIFT CHASSIS

CROSS-REFERENCE TO RELATED APPLICATIONS

This application claims the benefit of U.S. Provisional Application Ser. No. 63/618,766, titled "Rearward Mast Forklift Chassis," filed by Robert Chavez on Jan. 8, 2024.

This application claims the benefit of U.S. Provisional Application Ser. No. 63/689,081, titled "Rearward Mast Forklift Chassis," filed by Robert Chavez on Aug. 30, 2024.

This application incorporates the entire contents of the foregoing applications herein by reference.

TECHNICAL FIELD

Various embodiments relate generally to forklifts and the handling and transport of goods.

BACKGROUND

Forklifts may, for example, include industrial trucks designed for lifting, transporting, and stacking materials with efficiency and precision. These vehicles may, for example, include a pair of forks attached to the front that can be raised and lowered, providing a versatile platform for lifting loads. Hydraulic system controls may, for example, be used to control the elevation and descent of the forks, allowing for precise adjustments to accommodate various load sizes and weights.

SUMMARY

Apparatus and associated methods relate to a rearward mast forklift chassis. In an illustrative example, the rearward mast forklift chassis may include a fixed mast extending along a longitudinal axis positioned behind an axle of the front wheels of a forklift. The rearward mast forklift chassis may include a forklift device extending over the axle of the front wheels coupled to the fixed mast. The rearward mast forklift chassis may include an operator region located behind the fixed mast. The rearward mast forklift chassis may include a forklift device including a forklift positioned in front of the axle of the front wheels pivotally coupled to a tilt swivel and coupled to a tilt cylinder configured such cylinder may extend and/or retract to adjust an angle of the forklift. Various embodiments may advantageously improve efficiency, load stability, weight distribution, and safety.

Various embodiments may achieve one or more advantages. For example, the rearward mast may, for example, naturally balance the load by shifting the center of gravity toward the rear of the machine. This balance may, for example, reduce the need for additional counterweight and/or in some configurations eliminate counterweights, allowing for lighter and more efficient forklifts. Some embodiments may by positioning the mast behind the axle of the front wheels enhance operator visibility. For example, some embodiments may by positioning the mast behind the axle of the front wheels enhance operator visibility and reduce blind spots. For example, some embodiments may by positioning the mast behind the axle of the front wheels enhance more precise handling of materials. Embodiments may advantageously, for example, optimize weight distribution. Embodiments may advantageously, for example, result in better load stability. Embodiments may advantageously, for example, reduce wear on the front axle and tires. Embodiments may, for example, enhance maneuverability in tight spaces.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a rearward mast forklift chassis system introduced with reference to FIG. 1. Second, that introduction leads into a description with reference to FIGS. 2-6 of some embodiments of a rearward mast forklift chassis embodiment.

Figure 1:
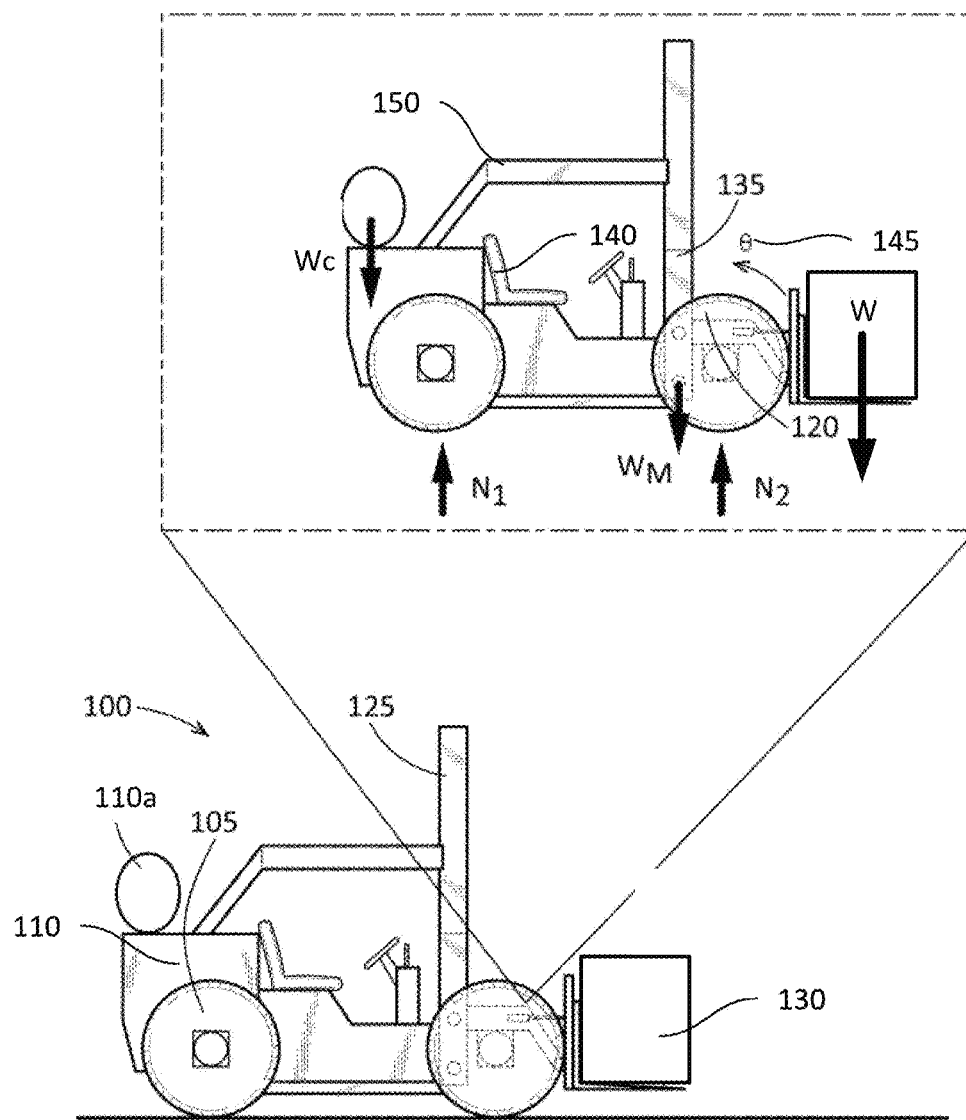
FIG. 1 depicts a rearward mast forklift chassis embodiment employed in an illustrative use-case scenario.

FIG. 1 depicts an exemplary rearward mast forklift chassis employed in an illustrative use-case scenario 100. The use-case scenario 100 includes a forklift 105. The forklift 105 is transporting a container 130. The container as depicted in FIG. 1, may, for example, be modeled to have a weight W. The container may, for example, include a liquefied petroleum gas (LPG) tank. The container may, for example, include a goods container. The container may, for example, include cargo. The container may, for example, contain a liquid. The liquid may, for example, include fuel.

The forklift 105 includes a forklift device 115. The forklift device 115 is supporting the transport item 130. The transport item may, for example, include a drum barrel. The transport item may, for example, include a rectangular container. The transport item may, for example, include a cube and/or square container. The transport item includes a weight W, as depicted in FIG. 1.

The forklift 105 includes a counterweight 110. In some embodiments, the counterweight device may, for example, optimize load balance. The device may, for example, include an adjustable counterweight. The counterweight 110 may, for example, include multiple transport items. The number of rearward transport items may, for example, be increased and/or decreased based on the forward transport items. The counterweight may, for example, be modeled as depicted in FIG. 1 as a counterweight Wc. The counterweight may, for example, include a weight associated with a fuel drum 110*a*. The fuel drum may, for example, include a natural gas fuel drum. The counterweight Wc may, for example, be modular based on the weight distribution of additional weights, such as the fuel drum.

The forklift device 115 includes a tilting device 120. The tilting device 120 is coupled to a fixed mast 125. The fixed mass may, for example, be modeled as depicted as FIG. 1 to have a weight Wm. The fixed mast 125 includes a coupling region. The tilting device 120 may, for example, couple to the fixed mast 125 located behind axle of the front wheels of the forklift at the coupling region.

The titling device 120 may be configured to tilt predetermined angle range 145 The tilting device may, for example, be configured to tilt 6 degrees counterclockwise. The tilting device may, for example, be configured to tilt 6 degrees clockwise. The titling device may, for example, be configured to tilt 10 degrees. The tilting device may, for example, be configured to tilt 4 degrees. The titling device may, for example, be configured to tilt 8 degrees. The titling device may, for example, be configured to tilt 5 degrees. The predetermined angle range may, for example, depend on external parameters such as the weight of the container, type of forklift, and/or the type of cargo transported. The predetermined angle may, for example, be referred to as theta, as depicted in FIG. 1.

The forklift 105 includes a forward set of wheels and a rearward set of wheels. The rearward set of wheels may, for example, support a rearward normal force N1. The forward set of wheels may, for example, support a forward normal force N2. The normal forces may, for example, equal the combined mass of the weight (e.g., Wc, Wm, W). The position of the Wm behind the front axle may, for example, reduce moments forward of the axle improving the cargo capacity W, of the rearward mast forklift.

The fixed mast 125 includes rollers configuration 135. The rollers configuration 135 may, for example, be used to change the vertical orientation of the lifting device and titling device. The rollers may, for example, be used to lift the lifting device and tilting device along the vertical path of the mast. The rollers may, for example, be used to lower the lifting and titling device along the vertical path of the mast.

The forklift 105 includes an operator region 140 located behind the fixed mast 125. The operator region may, for example, be covered by an overhead guard 150 secured above the operator region, configured such that the overhead guard protects the operator from falling objects.

In some embodiments, the rollers in the mast allow for a smooth operation of the lifting device. These rollers may, for example, be mounted on the mast channels and guide rails, allowing a carriage (e.g., the part that holds the forks) to move up and down along the mast. Rollers may, for example, reduce friction and be used such that the carriage moves vertically with less resistance. This may, for example, improve efficiency and precise lifting and lowering of loads.

In some embodiments, the mast of a forklift may, for example, include multiple stages, with each stage having its own set of rollers. The mast may, for example, telescope and/or extend or retract. The rollers may, for example, facilitate the smooth movement of the carriage. Proper maintenance of these rollers may, for example, improve the forklift's overall performance and longevity. Regular lubrication and inspection may, for example, be used to facilitate the rollers operating smoothly and without issues.

In some embodiments, the transmission may be automatic, manual, and/or hydrostatic, depending on operational needs. For manual transmissions, a clutch may, for example, engage and disengage the transmission from the engine, while automatic forklifts employ torque converters. The engine may, for example, be powered by internal combustion engines like gasoline, diesel, or propane. The engine may, for example, be powered by electric motors with rechargeable batteries.

In some embodiments, hydraulics may, for example, be used in the lifting device. For example, a hydraulic pump, powered by the engine, propels hydraulic fluid to operate lift and tilt cylinders responsible for raising and lowering forks and tilting the mast. The hydraulic system may, for example, rely on a reservoir for storing fluid, and a control valve regulates the flow to cylinders, ensuring precise control over the forklift's movements.

In some embodiments, routine maintenance, including fluid checks and changes, may be performed to sustain optimal hydraulic system functionality.

In some embodiments, the load may, for example, extend along the longitudinal direction of the mast. Counterweights may, for example, only be needed to support the momentum generated from the weight as the load rises and lowers along the mast.

The rearward mast forklift chassis may, for example, have different embodiment designs that optimize load handling and maneuverability in various industrial settings. The rearward mast forklift chassis may, for example, incorporate advanced hydraulic systems that ensure precise control and adaptability. The rearward mast forklift chassis may, for example, feature modular components that allow for easy customization and scalability depending on the operational requirements. The rearward mast forklift chassis may, for example, be designed to accommodate both electric and internal combustion engines, offering flexibility in power sources. The rearward mast forklift chassis may, for example, include reinforced structural elements that enhance durability and extend the operational lifespan of the forklift. The rearward mast forklift chassis may, for example, be equipped with smart technology interfaces that provide real-time data on load dynamics and forklift performance.

The rearward mast forklift chassis may, for example, leverage design advantages that improve efficiency and safety in material handling. The rearward mast forklift chassis may, for example, use a counterbalanced weight system that minimizes the need for larger counterweights, thus reducing the overall weight of the forklift. The rearward mast forklift chassis may, for example, offer a swivel device that enhances the operator's ability to manipulate loads with greater ease and precision. The rearward mast forklift chassis may, for example, employ tilt cylinders that provide a stable tilting action, allowing for better handling of unevenly distributed loads. The rearward mast forklift chassis may, for example, integrate hydraulic inter-reeling to facilitate the use of various fork attachments seamlessly. The rearward mast forklift chassis may, for example, position the mast in a way that maximizes leverage and balance, improving the operational efficiency of the forklift.

The rearward mast forklift chassis may, for example, incorporate safety advantages that protect both the operator and the integrity of the loads being handled. The rearward mast forklift chassis may, for example, provide an improved operator view, which enhances visibility and reduces the risk of accidents. The rearward mast forklift chassis may, for example, maintain a stable load capacity, ensuring that the forklift's load capacity rating remains constant regardless of the tilt angle. The rearward mast forklift chassis may, for example, feature a streamlined design that eliminates unnecessary protrusions, reducing the likelihood of snagging or collision in tight spaces. The rearward mast forklift chassis may, for example, be equipped with sensors that monitor environmental conditions and load stability, offering automated adjustments to improve safety. The rearward mast forklift chassis may, for example, include safety features that exceed standard crash regulation load ratings, offering enhanced protection under extreme conditions. The rearward mast forklift chassis may, for example, contribute to a safer working environment through its innovative design features that prioritize operator visibility and load stability.

Figure 2:
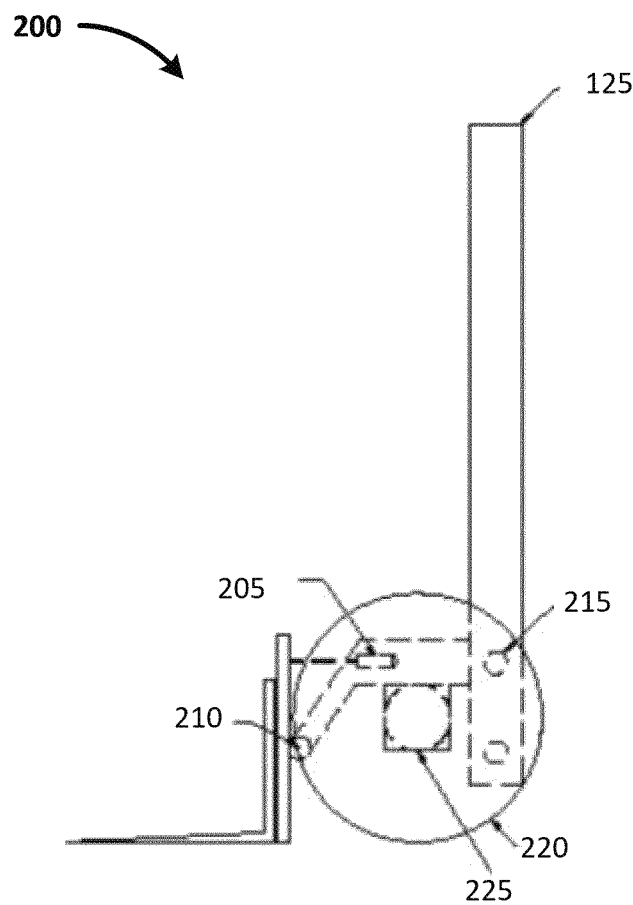
FIG. 2 depicts a front axle assembly embodiment that supports the weight of the forklift during operation.

FIG. 2 depicts a front axle assembly embodiment 200 that supports the weight of the forklift during operation. The front axle assembly may, for example, be used to handle both vertical stresses. The front axle assembly may, for example, be used to handle horizontal load stresses efficiently.

The front axle assembly 200 includes a tilt cylinder 205. The tilt cylinder may, for example, be used to provide controlled angular adjustments of the forks, ensuring stability during load handling. The tilt cylinder may, for example, use linear actuators to actuate the cylinder. The tilt cylinder may, for example, use hydraulics to actuate the cylinder. The tilt cylinder may, for example, use pneumatics to actuate the cylinder.

The front axle assembly 200 includes a tilt swivel 210. The tilt swivel may, for example, attach to the base of the lifting device. The tilt swivel may, for example, be used to allow the forks to pivot at various angles. The tilt swivel may, for example, improve maneuverability when placing and/or lifting loads. Reinforced mounting points may, for example, be used to secure components such as the tilt cylinder and swivel to the chassis frame.

The front axle assembly includes rollers 215. The rollers of the car may, for example, be coupled to the mast such that the rollers may, for example, be used to raise and lower the front axle assembly along the longitudinal direction of the mast.

In some embodiments. a base support structure connects the tilt cylinder to the front axle assembly.

The front axle assembly 200 includes a pair of front tires 220. The front tires 220 are coupled to a front axle 225. The front axle may, for example, be used to keep alignment of the front wheel and distribute the weight evenly across the forklift's front wheels.

Figure 3:
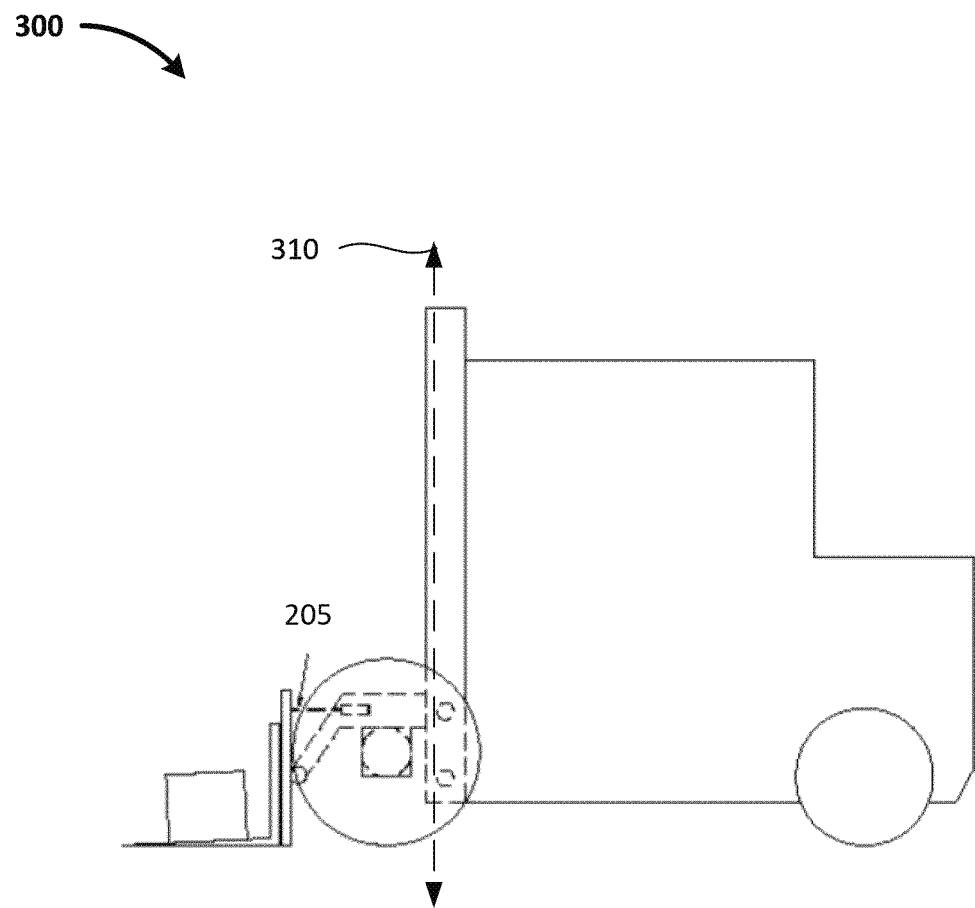
FIG. 3 depicts a rearward mast forklift chassis embodiment.

FIG. 3 depicts a rearward mast forklift chassis embodiment 300. The tilt cylinder 205 may, for example, be integrated into the chassis to provide precise adjustments. The tilt cylinder 205 may, for example, stabilize the forklift's lifting device and manages angular changes during load handling. A longitudinal axis 310 runs vertically along the mast. The longitudinal axis 310 ensures proper alignment of all load-bearing components and supports vertical movement of the lifting device.

In some embodiments, the rearward mast forklift chassis may, for example, be used such that the load travels in a straight vertical path along the mast. The rearward chassis may, for example, be used to maintain a predetermined distance from the pivot point and/or pendulum axis (e.g., pivot point located at front axle). This configuration may, for example, prevent the forklift's lifting capacity from diminishing as the load is raised. For example, with a zero-moment condition at the front axle, a 1,000-pound load on the front forks may be balanced by a 1,000-pound counterweight from the mast to improve stable handling as the moments cancel. This may, for example, be scaled for different forklifts (e.g., 1000 lbs, 5000 lbs, 10,000 lbs, etc.).

For context, conventional forklifts, may, for example, experience a reduction in rated capacity as the mast tilts forward or the load height increases. In some embodiments, the rearward mast forklift chassis may, for example, maintain a constant load capacity independent of lifting height and/or predetermined tilt angle.

Figure 4:
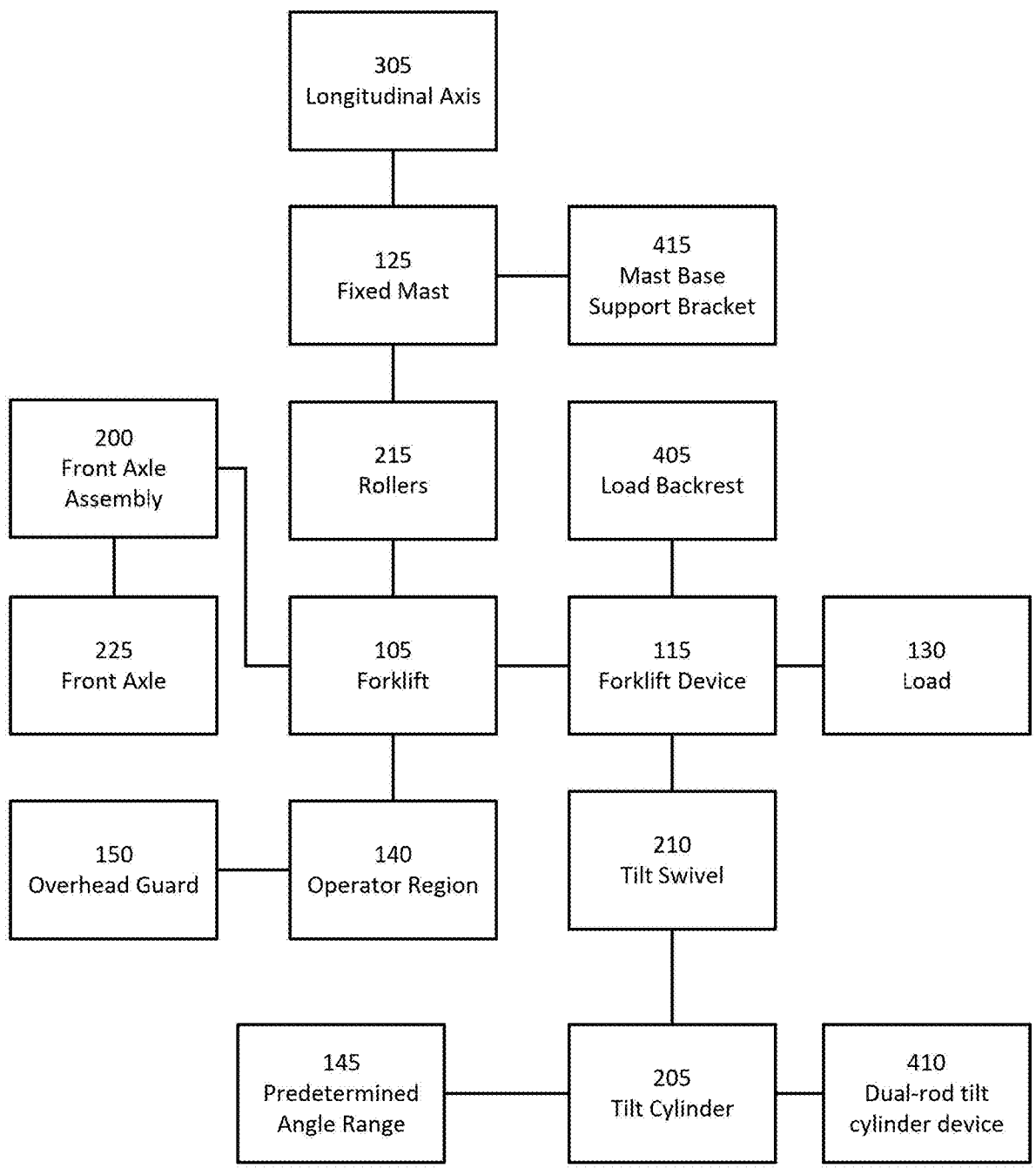
FIG. 4 depicts a block diagram of a rearward mast forklift chassis embodiment.

FIG. 4 depicts a block diagram of a rearward mast forklift chassis embodiment 400. The rearward mast forklift chassis embodiment 400 includes a load backrest 405. The load backrest may, for example, be integrated into the forklift device 115 to prevent loads from sliding backward during transport. The load backrest 405 may, for example, provide safety improvements by improving load stability during lifting and movement.

The rearward mast forklift chassis embodiment 400 includes a dual-rod tilt cylinder device 410. The dual-rod cylinder device may, for example, balance force distribution during tilting operations. The dual-rod tilt cylinder device may, for example, include two rods to improve the forklift's durability and stability. This dual-rod configuration may, for example, maintain consistent tilt control when handling uneven and/or heavy loads.

The rearward mast forklift chassis embodiment 400 includes a mast base support bracket 415. The mast base support bracket may, for example, provide foundational stability to the rearward mast forklift chassis. Positioned beneath the fixed mast 125, the bracket 415 may, for example, secure the mast in place and prevents unwanted movement during operation. In some embodiments, the mast base support bracket 415 may, for example, include lateral braces to reduce torsional stress. This may, for example, improve the structural integrity and load-handling capacity of the forklift.

Figure 5:
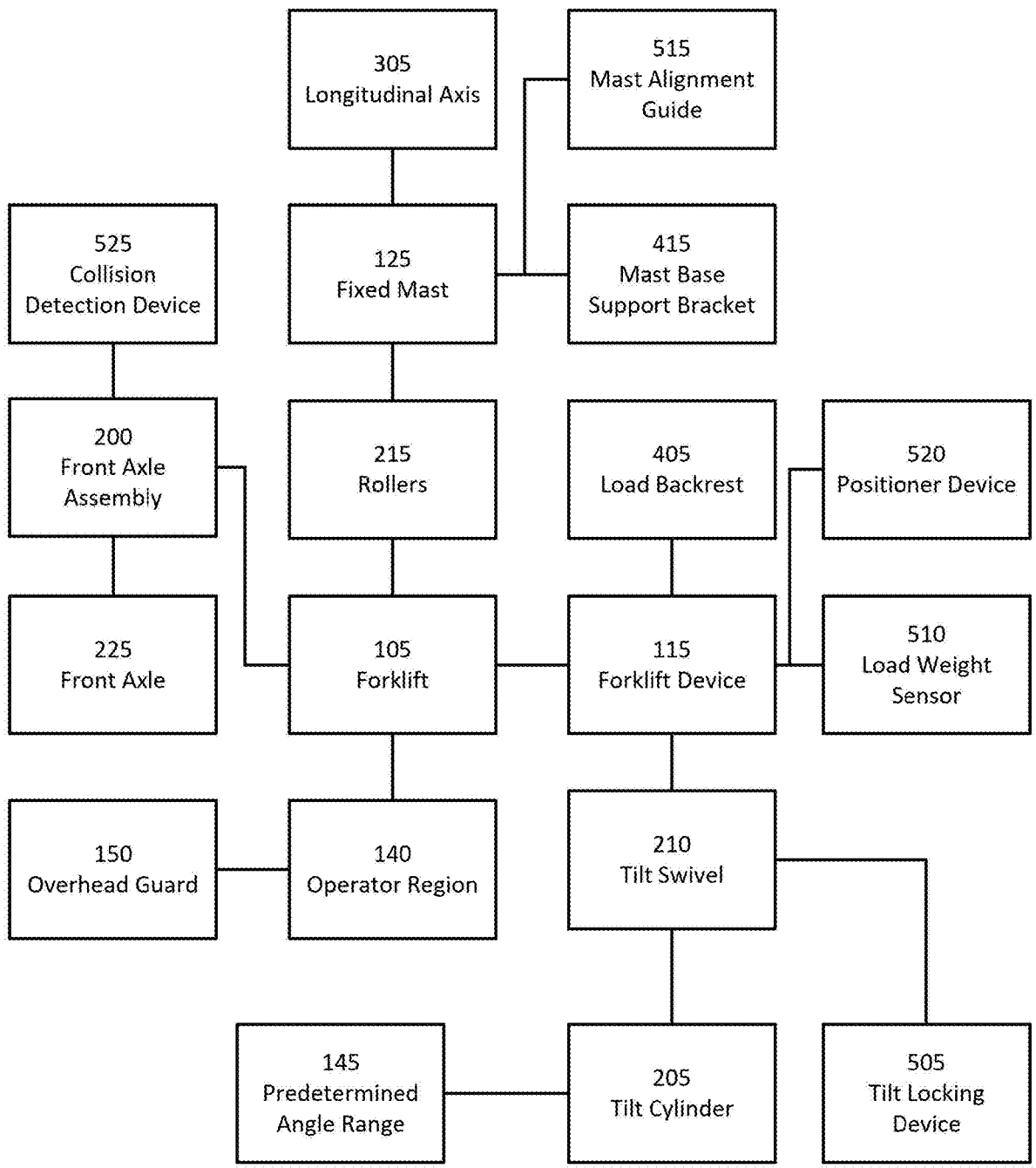
FIG. 5 depicts a block diagram of a rearward mast forklift chassis embodiment.

FIG. 5 depicts a block diagram of a rearward mast forklift chassis embodiment 500. A tilt locking device 505 is integrated into the forklift device 115. The locking device 505 secures the forklift at a fixed tilt angle, preventing unwanted movement during load transport. A load weight sensor 510 is installed within the forklift device 115. The sensor 510 provides real-time weight measurements, allowing the operator to manage loads efficiently. The rearward mast forklift chassis 500 includes a mast alignment guide 515. The mast alignment guide 515 ensures precise load positioning by maintaining the fixed mast 125 along the longitudinal axis 305. A positioner device 520 is mounted to the forklift device 115. The positioner device 520 adjusts the lateral spacing of the forks to accommodate various load sizes. A collision detection device 525 is mounted on the chassis 500. The detection device 525 alerts the operator to nearby obstacles, improving safety during forklift operations.

Figure 6:
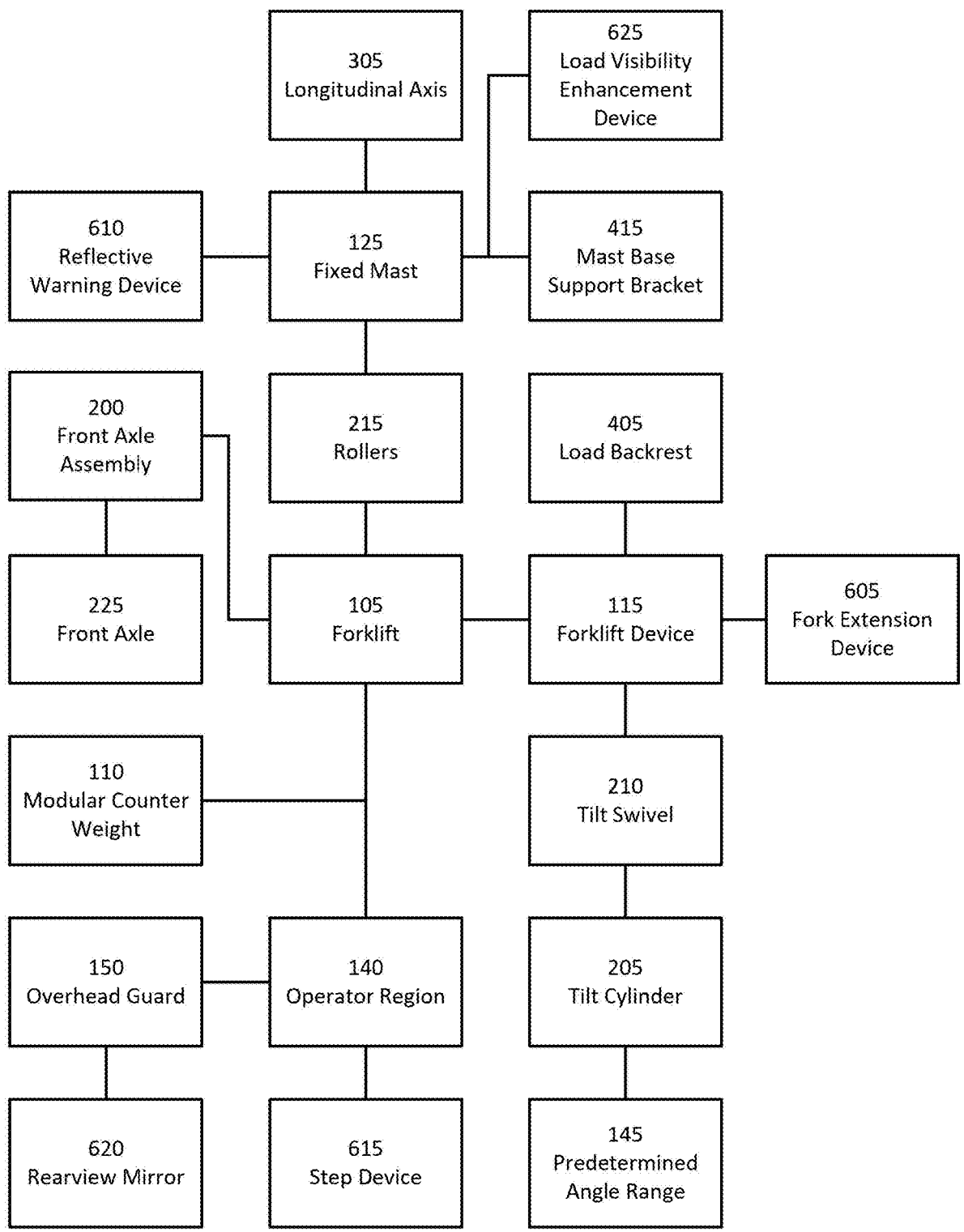
FIG. 6 depicts a block diagram of a rearward mast forklift chassis embodiment.

FIG. 6 depicts a block diagram of a rearward mast forklift chassis embodiment 600. A fork extension device 605 is integrated into the forklift device 115. The extension device 605 increases the reach of the forks for handling longer loads.

The rearward mast forklift chassis 600 includes a reflective warning device 610. The reflective device 610 enhances visibility in low-light environments, increasing operational safety.

The chassis 600 includes a step device 615 mounted near the operator region 140. The step device 615 provides safe access for operators entering or exiting the forklift.

A rearview mirror 620 is mounted on the overhead guard 150. The mirror 620 improves the operator's visibility of the rear workspace during operation.

A load visibility enhancement device 625 is installed on the fixed mast 125. The enhancement device 625 ensures an unobstructed view of the load during lifting operations.

Although various embodiments have been described with reference to the figures, other embodiments are possible.

Although an exemplary system has been described with reference to FIGS. 1-6, other implementations may be deployed in other industrial, scientific, medical, commercial, and/or residential applications.

In some embodiments, the rearward mast forklift chassis may significantly reduce energy waste during forklift operations by optimizing weight distribution. For context, traditional forklifts may, for example, require substantial counterweights to balance the forward mast, resulting in excess weight even when the forklift is empty. By relocating the mast to the rearward position, the need for large counterweights is minimized, reducing the overall weight of the machine. This adjustment decreases the energy consumption required to move the forklift, particularly when the forklift operates without a load.

In some embodiments, forklifts spend a significant portion of their operational time empty, (e.g., around 50%), as forklifts return to pick up new loads. For context, during these empty runs, traditional forklifts may, for example, carry unnecessary counterweight, increasing fuel and/or battery consumption. For example, a conventional 10,000-pound forklift may pull an additional 2,000 pounds of counterweight even when not carrying a load. In contrast, a rearward mast forklift designed for a 5,000-pound capacity could reduce unnecessary weight by approximately 20%, enhancing efficiency and reducing wear on the engine and transmission.

In some embodiments, electric forklifts, particularly stand-up units, may, for example, advantageously reduce the forklift's weight directly impacts battery life, allowing electric models to operate longer between charges. With less weight to move during empty runs, electric forklifts may, for example, achieve greater energy efficiency. The reduced strain on the battery may, for example, prolong the battery lifespan.

In some embodiments, the rearward mast design may, for example, affect counterweight requirements. In some cases, the counterweight may be entirely eliminated or substantially reduced due to the repositioned mast. For context, traditional forklifts require significant counterweights to offset the forward mast's loa. The rearward mast may, for example, naturally balance the load by shifting the center of gravity toward the rear of the machine. This balance reduces the need for additional counterweight, resulting in a lighter, more efficient forklift that is easier to maneuver and less taxing on power systems.

In some embodiments, by reducing the overall weight and optimizing energy efficiency, the rearward mast forklift chassis may, for example, improve the use and efficiency of different forklifts such as 5000 lbs forklifts. the rearward mast forklift chassis may, for example, improve the use and efficiency of different forklifts such as 10,000 lbs forklifts. The rearward mast forklift chassis may, for example, improve the use and efficiency of different forklifts, such as 3000 lbs forklifts.

For context, tilting in a forklift involves a pivotal technical aspect associated with the mast, which is the vertical assembly supporting the forks. The mast may be equipped with a hydraulic tilting device essential for adjusting the angle of the forks, enabling operators to handle loads with uneven weight distribution or place them on elevated surfaces accurately. The hydraulic system governing the mast's tilt includes a pump, hydraulic fluid, and control valves. When an operator activates the tilt control, the hydraulic pump pressurizes the fluid, directing it through control valves to hydraulic cylinders attached to the mast. These cylinders extend or retract, tilting the mast and adjusting the angle of the forks as needed. This controlled tilting device enhances the forklift's adaptability in material handling tasks.

For context, some embodiments may, for example, be equipped with electric and/or internal combustion engines, forklifts offer a balance between power and maneuverability, enabling them to navigate confined spaces with agility.

Some embodiments may, for example, include safety features, including stability devices and operator cabins, ensure secure handling of loads, making forklifts indispensable tools in optimizing efficiency and productivity within diverse industrial settings.

In some embodiments, the rearward mast forklift chassis includes a mast chassis configuration where the mast is positioned rearward of the initial set of front wheels. The forklift chassis includes a tilt device. The tilt device extends from the mast over the axle of the front wheels to the fork, to allow controlled tilting of the forks. The tilt device includes a hydraulic system to exert force for rotation and tilt angle adjustment.

In some implementations, when the hydraulic system is extended at a specified point, the forks, integrated with both the tilt device and the mast, can be angled for efficient object pickup and transport. Objects transported may, for example, include items such as a bale of hay, crates, barrels, large objects, warehouse items. Objects may, for example, be transported in warehouses, construction sites, loading docks, recycling centers, dumping centers, stacking, lifting drum barrels, etc. An operator control interface may, for example, facilitate real-time adjustment of the fork tilt.

Some embodiments may, for example, advantageously ensure that the forklift's lifting capacity remains constant, irrespective of the load or tilt angle. The placement of the mast within the frame may, for example, reduce the need for additional counterweights, resulting in a lighter overall forklift. This reduction in weight may, for example, contribute to increased fuel efficiency. The reduction in weight may, for example, allow for a shorter forklift length, enhancing maneuverability in confined spaces. The diminished cyclical stress on the forklift due to a fixed-capacity mast may, for example, extend the lifespan of the transmission, translating to longer operational periods and reduced maintenance requirements. The rearward chassis frame may, for example, require fewer moving parts in the mast than traditional forklifts, further increasing operational efficiency and minimizing maintenance demands. Some embodiments may, for example, promote fuel efficiency and durability. Some embodiments may, for example, ensure extended operational hours, making it applicable for a wide range of applications, including both electric and non-combustible engine-powered forklifts.

In some embodiments, the rearward mast forklift chassis includes a mast positioned behind the primary set of front wheels. The rearward placement reduces the need for additional counterweights, resulting in a lighter overall structure that improves fuel efficiency and allows for a more compact chassis. The lighter weight and shorter frame enhance the forklift's maneuverability, especially beneficial in confined spaces such as warehouses, construction sites, and loading docks.

The chassis includes a tilt device powered by a hydraulic system, which extends from the mast over the axle of the front wheels to the forklift device, enabling controlled adjustments to the tilt angle up to 6 degrees in both clockwise and counterclockwise directions. This tilting capability allows for efficient and stable handling of different loads, including bales, crates, barrels, and/or other common items. The forklift may, for example, be adjustable in real-time via an operator control interface, supporting precise positioning for object pickup and transport.

In some embodiments, the rearward mast configuration may, for example, reduce cyclical stress on the transmission. The configuration may, for example, extend the lifespan of key components, decreasing the need for frequent maintenance and potentially prolonging the forklift's operational life. The configuration may, for example, have fewer moving parts in the mast. The hydraulic system includes a reservoir to store fluid and a control valve to regulate flow. The hydraulic system may, for example, allow for precise lift and tilt control. The mast includes rollers that guide the vertical movement of the lifting device, reducing friction and ensuring smooth operation, which contributes to efficient lifting and lowering of loads. The chassis may, for example, be compatible with multiple engine types, including gasoline, diesel, propane, and electric motors with rechargeable batteries.

Although an example of a system, which may be portable, has been described with reference to the above figures, other implementations may be deployed in other processing applications, such as desktop and networked environments.

In an illustrative aspect, some embodiments may, for example, include a rearward mast forklift chassis including a fixed mast extending along a longitudinal axis positioned behind an axle of the front wheels of a forklift; a forklift device extending over the axle of front wheels operably coupled to the fixed mast by rollers configured to operate the forklift device along the longitudinal axis of the fixed mast; and, an operator region located behind the fixed mast.

In some embodiments, the rearward mast forklift chassis may, for example, include the forklift device pivotally couples to a tilt swivel device and couples to a tilt cylinder configured such the tilt cylinder adjusts an angle of the forklift rotatable about the tilt swivel device.

In some embodiments, the rearward mast forklift chassis may, for example, further include a tilt locking device integrated into the tilt swivel device, configured such that the tilt locking device secures the forklift device at a fixed tilt angle during load transport.

In some embodiments, the rearward mast forklift chassis may, for example, be configured such that the tilt cylinder couples to the forklift device such that the swivel device rotatably tilts 12 degrees or less.

In some embodiments, the rearward mast forklift chassis may, for example, further include a front axle assembly with reinforced mounting points coupled to the tilt swivel device, configured such that the front axle assembly supports the forklift device during operation.

In some embodiments, the rearward mast forklift chassis may, for example, further include a load backrest mounted on the forklift device, configured such that the load backrest prevents loads from sliding backward during lifting operations.

In some embodiments, the rearward mast forklift chassis may, for example, further include an overhead guard secured above the operator region, configured such that the overhead guard protects the operator from falling objects.

In some embodiments, the rearward mast forklift chassis may, for example, further include a rear-view mirror device mounted on the overhead guard, configured such that the rear-view mirror device improves a visibility of an operator of a rear workspace during operation.

In some embodiments, the rearward mast forklift chassis may, for example, further include a dual-rod tilt cylinder device configured such that the dual-rod tilt cylinder device ensures force distribution during tilting operations.

In some embodiments, the rearward mast forklift chassis may, for example, include a mast base support bracket mounted to the chassis, configured such that the mast base support bracket reinforces a connection of the fixed mast to the chassis.

In some embodiments, the rearward mast forklift chassis may, for example, further include a load weight sensor integrated into the forklift device, configured such that the load weight sensor provides real-time weight measurements to the operator for improved load management.

In some embodiments, the rearward mast forklift chassis may, for example, further include a mast alignment guide integrated into the fixed mast and forklift device, configured such that the mast alignment guide guides the forklift device while operating along the longitudinal axis of the fixed mass.

In some embodiments, the rearward mast forklift chassis of claim 1 further including a positioner device mounted on the forklift device, configured such that the positioner device adjusts a lateral spacing of forks of the forklift device to accommodate different load dimensions.

The rearward mast forklift chassis of claim 1 further including a collision detection device mounted on the operator region, configured such that the collision detection device alerts the operator to obstacles in a forklift's immediate path.

In some embodiments, the rearward mast forklift chassis may, for example, include a fork extension device attached to the forklift device, configured such that the forklift extension device increases a reach length of forks configured such that the forks handle longer loads.

In some embodiments, the rearward mast forklift chassis may, for example, further include a reflective warning device mounted to the mast, configured such that the reflective warning device enhances visibility of the forklift in low-light environments.

In some embodiments, the rearward mast forklift chassis may, for example, further include a step device mounted to the operator region.

The rearward mast forklift chassis may, for example, further include a modular counterweight device attached to the chassis, configured such that the weight of the modular counterweight device may be adjusted.

The rearward mast forklift chassis may, for example, further include a load visibility enhancement device mounted on the mast, configured such that the load visibility enhancement provides an unobstructed view of the load during lifting operations.

The rearward mast forklift chassis may, for example, further include a 5000 lb forklift.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A rearward mast forklift chassis comprising:
   a fixed counterweight mast extending along a longitudinal axis positioned behind an axle of the front wheels of a forklift;
   a forklift device arm extending over the axle of front wheels operably coupled to the fixed mast by rollers configured to operatively raise and lower the forklift device arm forward of the axle of the front wheels along the longitudinal axis of the fixed counterweight mast;

a counterweight mast alignment guide integrated into the fixed counterweight mast, configured to guide the forklift arm while operating along the longitudinal axis of the fixed mast;

a tilt swivel device coupled to a lowered extension of the forklift device arm to pivotally couple forks to the forklift device arm;

a load backrest mounted to the forks operatively coupled to at least one tilt piston mounted to the forklift arm forward of the axle of the front wheels, wherein the at least one tilt piston is configured to extend and to retract to adjust an angle of the forks and load backrest rotatable about the tilt swivel device; and, an operator region located behind the fixed counterweight mast.

2. The rearward mast forklift chassis of claim 1, wherein the at least one tilt piston, comprises two opposing hydraulic tilt pistons configured such that the load mounted backrest and forks will maintain position until receiving actuation to tilt about the swivel device.

3. The rearward mast forklift chassis of claim 1, wherein the at least one tilt piston couples to the forklift device such that the forks rotatably tilts 12 degrees or less.

4. The rearward mast forklift chassis of claim 1, further comprising:
a front axle assembly with reinforced mounting points coupled to the tilt swivel device, configured such that the front axle assembly supports the forklift device during operation.

5. The rearward mast forklift chassis of claim 1 further comprising:
an overhead guard secured above the operator region, configured such that the overhead guard protects the operator from falling objects.

6. The rearward mast forklift chassis of claim 5 further comprising:
a rear-view mirror device mounted on the overhead guard, configured such that the rear-view mirror device improves a visibility of an operator of a rear workspace during operation.

7. The rearward mast forklift chassis of claim 1 further comprising:
a dual-rod tilt cylinder device configured such that the dual-rod tilt cylinder device ensures force distribution during tilting operations.

8. The rearward mast forklift chassis of claim 1 further comprising:
a mast base support bracket mounted to the chassis, configured such that the mast base support bracket reinforces a connection of the fixed mast to the chassis.

9. The rearward mast forklift chassis of claim 1 further comprising:

a load weight sensor integrated into the forklift device, configured such that the load weight sensor provides real-time weight measurements to the operator for improved load management.

10. The rearward mast forklift chassis of claim 1 further comprising:
a mast alignment guide integrated into the fixed mast and forklift device, configured such that the mast alignment guide guides the forklift device while operating along the longitudinal axis of the fixed mast.

11. The rearward mast forklift chassis of claim 1 further comprising:
a positioner device mounted on the forklift device, configured such that the positioner device adjusts a lateral spacing of forks of the forklift device to accommodate different load dimensions.

12. The rearward mast forklift chassis of claim 1 further comprising:
a collision detection device mounted on the operator region, configured such that the collision detection device alerts the operator to obstacles in a forklift's immediate path.

13. The rearward mast forklift chassis of claim 1 further comprising:
a fork extension device attached to the forklift device, configured such that the forklift extension device increases a reach length of forks configured such that the forks handle longer loads.

14. The rearward mast forklift chassis of claim 1 further comprising:
a reflective warning device mounted to the mast, configured such that the reflective warning device enhances visibility of the forklift in low-light environments.

15. The rearward mast forklift chassis of claim 1 further comprising:
a step device mounted to the operator region.

16. The rearward mast forklift chassis of claim 1 further comprising:
a modular counterweight device attached to the chassis, configured such that the weight of the modular counterweight device may be adjusted.

17. The rearward mast forklift chassis of claim 1 further comprising:
a load visibility enhancement device mounted on the mast, configured such that the load visibility enhancement provides an unobstructed view of the load during lifting operations.

18. The rearward mast forklift chassis of claim 1 further wherein the forklift comprises a 5000 lb forklift.

* * * * *